United States Patent
Park et al.

(10) Patent No.: US 12,444,767 B2
(45) Date of Patent: *Oct. 14, 2025

(54) NEGATIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: SAMSUNG SDI CO., LTD., Yongin-si (KR)

(72) Inventors: Sang-Eun Park, Yongin-si (KR); Young-Ugk Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,989

(22) Filed: Nov. 13, 2023

(65) Prior Publication Data

US 2024/0088428 A1 Mar. 14, 2024

Related U.S. Application Data

(63) Continuation of application No. 17/164,800, filed on Feb. 1, 2021, now Pat. No. 11,830,972, which is a
(Continued)

(51) Int. Cl.
*H01M 4/36* (2006.01)
*H01M 4/134* (2010.01)
(Continued)

(52) U.S. Cl.
CPC ......... *H01M 10/052* (2013.01); *H01M 4/134* (2013.01); *H01M 4/1395* (2013.01);
(Continued)

(58) Field of Classification Search
CPC ....... H01M 4/366; H01M 4/134; H01M 4/386
See application file for complete search history.

(56) References Cited

U.S. PATENT DOCUMENTS

| 5,707,756 A | 1/1998 | Inoue et al. |
| 7,811,709 B2 | 10/2010 | Musha et al. |

(Continued)

FOREIGN PATENT DOCUMENTS

| CN | 1374712 A | 10/2002 |
| CN | 1610154 A | 4/2005 |

(Continued)

OTHER PUBLICATIONS

U.S. Final Office Action dated Oct. 28, 2021, issued in U.S. Appl. No. 13/440,918 {6 pages.
(Continued)

*Primary Examiner* — Jeffrey T Barton
(74) *Attorney, Agent, or Firm* — Womble Bond Dickinson (US) LLP

(57) ABSTRACT

A negative active material for a rechargeable lithium battery includes a core including a $SiO_2$ matrix and a Si grain, and a coating layer continuously or discontinuously coated on the core. The coating layer includes SiC and C, and the peak area ratio of the SiC (111) plane to the Si (111) plane as measured by X-ray diffraction analysis (XRD) using a CuKα ray ranges from about 0.01 to about 0.5.

20 Claims, 3 Drawing Sheets

Related U.S. Application Data continuation of application No. 13/440,918, filed on Apr. 5, 2012, now Pat. No. 11,502,326.

(60) Provisional application No. 61/537,309, filed on Sep. 21, 2011.

(51) Int. Cl.

| | | |
|---|---|---|
| *H01M 4/1395* | (2010.01) | |
| *H01M 4/38* | (2006.01) | |
| *H01M 4/48* | (2010.01) | |
| *H01M 4/505* | (2010.01) | |
| *H01M 4/525* | (2010.01) | |
| *H01M 4/58* | (2010.01) | |
| *H01M 4/583* | (2010.01) | |
| *H01M 4/62* | (2006.01) | |
| *H01M 10/052* | (2010.01) | |
| *H01M 10/0525* | (2010.01) | |
| *H01M 10/0569* | (2010.01) | |
| *H01M 10/0587* | (2010.01) | |
| *H01M 50/417* | (2021.01) | |
| *H01M 50/434* | (2021.01) | |
| *H01M 4/02* | (2006.01) | |

(52) U.S. Cl.
CPC ........... *H01M 4/366* (2013.01); *H01M 4/386* (2013.01); *H01M 4/483* (2013.01); *H01M 4/505* (2013.01); *H01M 4/525* (2013.01); *H01M 4/58* (2013.01); *H01M 4/583* (2013.01); *H01M 4/623* (2013.01); *H01M 10/0525* (2013.01); *H01M 10/0569* (2013.01); *H01M 10/0587* (2013.01); *H01M 50/417* (2021.01); *H01M 50/434* (2021.01); *H01M 2004/027* (2013.01); *H01M 2004/028* (2013.01); *H01M 2300/0031* (2013.01); *H01M 2300/0034* (2013.01)

(56) References Cited

U.S. PATENT DOCUMENTS

| | | | |
|---|---|---|---|
| 10,826,107 B2 * | 11/2020 | Park | H01M 4/483 |
| 11,830,972 B2 * | 11/2023 | Park | H01M 4/623 |
| 2002/0164479 A1 | 11/2002 | Matsubara et al. | |
| 2004/0115535 A1 | 6/2004 | Morita et al. | |
| 2005/0014065 A1 | 1/2005 | Jung et al. | |
| 2006/0003227 A1 | 1/2006 | Aramata et al. | |
| 2006/0051675 A1 | 3/2006 | Musha et al. | |
| 2006/0068287 A1 | 3/2006 | Morita et al. | |
| 2007/0224508 A1 | 9/2007 | Aramata et al. | |
| 2009/0029256 A1 | 1/2009 | Mah et al. | |
| 2009/0136847 A1 | 5/2009 | Jeong et al. | |
| 2009/0239151 A1 | 9/2009 | Nakanishi et al. | |
| 2009/0311606 A1 | 12/2009 | Fukuoka et al. | |
| 2010/0243951 A1 | 9/2010 | Watanabe et al. | |
| 2010/0288970 A1 | 11/2010 | Watanabe et al. | |
| 2011/0052953 A1 | 3/2011 | Saito et al. | |
| 2011/0165464 A1 | 7/2011 | Yew et al. | |

FOREIGN PATENT DOCUMENTS

| | | |
|---|---|---|
| CN | 101047234 A | 10/2007 |
| CN | 101908616 A | 12/2010 |
| EP | 2 372 816 A1 | 10/2011 |
| EP | 2 372 817 A1 | 10/2011 |
| JP | 2002-255529 A | 9/2002 |
| JP | 2004-335195 A | 11/2004 |
| JP | 2005-63767 | 3/2005 |
| JP | 2005-63767 A | 3/2005 |
| JP | 2005-203130 | 7/2005 |
| JP | 2005-203130 A | 7/2005 |
| JP | 2006-019127 A | 1/2006 |
| JP | 2006-19127 A | 1/2006 |
| JP | 2008-235247 | 10/2008 |
| JP | 2008-235247 A | 10/2008 |
| JP | 2008-282819 A | 11/2008 |
| JP | 2009-32693 A | 2/2009 |
| JP | 2009-224168 | 10/2009 |
| JP | 2009-224168 A | 10/2009 |
| JP | 2009-301935 A | 12/2009 |
| JP | 2010-225494 A | 10/2010 |
| KR | 10-2008-0019801 | 3/2008 |
| KR | 10-2008-0019801 A | 3/2008 |

OTHER PUBLICATIONS

U.S. Advisory Action dated Jan. 12, 2022, issued in U.S. Appl. No. 13/440,918 {4 pages).
US Notice of Allowance dated Jul. 13, 2022, issued in U.S. Appl. No. 13/440,918 (9 pages).
U.S. Office Action dated Jul. 9, 2019, issued in U.S. Appl. No. 15/699,997 (7 pages).
U.S. Final Office Action dated Feb. 4, 2020, issued in U.S. Appl. No. 15/699,997 (7 pages).
U.S. Advisory Action dated Jun. 1, 2020, issued in U.S. Appl. No. 15/699,997 (3 pages).
U.S. Notice of Allowance dated Jun. 29, 2020, issued in U.S. Appl. No. 15/699,997 (7 pages).
Kim, et al, *Si—SiC nanocomposite anodes synthesized using high-energy mechanical milling*, Journal of Power Sources vol. 130, (2004) pp. 275-280.
Patent Abstracts of Japan, and English machine translation of Japanese Publication 2004-335195, listed above, (12 pages).
English machine translation of Japanese Publication 2005-203130 dated Jul. 28, 2005, listed above (19 pages).
European Search Report dated Dec. 18, 2012, for corresponding European Patent application 12178553.9, (6 pages).
SIPO Office action dated Oct. 9, 2015, with English translation, for corresponding Chinese Patent application 201203564740, (14 pages).
KIPO Office action dated Jan. 30, 2016, corresponding to Korean Patent application 10-2012-0080227, (5 pages).
EPO Office action dated Feb. 26, 2016, for corresponding European Patent application 12178553.9, (4 pages).
JPO Office Action dated May 23, 2016 issued in Japanese Patent Application No. 2012-181428 (3 pages).
KIPO Notice of Allowance dated Jul. 29, 2016 issued in Korean Patent Application No. 10-2012-0080227 (5 pages).
U.S. Final Office Action dated Nov. 15, 2017, issued in U.S. Appl. No. 13/440,918 (8 pages).
U.S. Advisory Action dated Mar. 22, 2018, issued in U.S. Appl. No. 13/440,918 (3 pages).
U.S. Office Action dated Jun. 18, 2018, issued in U.S. Appl. No. 13/440,918 (7 pages).
U.S. Final Office Action dated Jan. 18, 2019, issued in U.S. Appl. No. 13/440,918 (6 pages).
U.S. Advisory Action dated Mar. 28, 2019, issued in U.S. Appl. No. 13/440,918 (4 pages).
U.S. Office Action dated Sep. 25, 2019, issued in U.S. Appl. No. 13/440,918 (7 pages).
U.S. Final Office Action dated Jan. 10, 2020, issued in U.S. Appl. No. 13/440,918 {7 pages).

* cited by examiner

NEGATIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application is a continuation of U.S. patent application Ser. No. 17/164,800, filed Feb. 1, 2021, which is a continuation of U.S. patent application Ser. No. 13/440,918, filed Apr. 5, 2012, now U.S. Pat. No. 11,502,326, which claims priority to and the benefit of U.S. Provisional Application No. 61/537,309, filed on Sep. 21, 2011, the entire contents of all which are incorporated herein by reference.

BACKGROUND

1. Technical Field

The disclosure relates to a negative active material for a rechargeable lithium battery and to a rechargeable lithium battery including the same.

2. Description of the Related Art

Lithium rechargeable batteries have recently drawn attention as power sources for small portable electronic devices. Lithium rechargeable batteries use organic electrolyte solutions, and thus have twice the discharge voltage of conventional batteries using alkaline aqueous electrolyte solutions. As a result, lithium rechargeable batteries have high energy density.

As the positive active material for rechargeable lithium batteries, lithium-transition element composite oxides that are capable of intercalating lithium (such as $LiCoO_2$, $LiMn_2O_4$, $LiNi_{1-x}Co_xO_2$ (0<x<1), and so on) have been researched.

As the negative active material, rechargeable lithium batteries use various carbon-based materials (such as artificial graphite, natural graphite, and hard carbon) that can intercalate and deintercalate lithium ions. However, recent research has been conducted into non-carbon-based negative active materials (such as Si) to address the need for stability and high-capacity.

SUMMARY

In one embodiment, a negative active material for a rechargeable lithium battery is capable of improving the cycle-life of a rechargeable lithium battery.

In another embodiment, a rechargeable lithium battery includes the negative active material.

According to one embodiment, a negative active material for a rechargeable lithium battery includes a core including a $SiO_2$ matrix and a Si grain, and a coating layer continuously or discontinuously coated on the core. The coating layer includes SiC and C; and the peak area ratio of the SiC (111) plane to the Si (111) plane (as measured by X-ray diffraction analysis (XRD) using a CuKα ray) ranges from about 0.01 to about 0.5.

In the core, a ratio of the content of $SiO_2$ matrix and Si grain may be represented by $SiO_x$ (0.3≤x≤1.2).

The negative active material may have an average particle size of about 0.5 μm to about 50 μm.

The coating layer may have a thickness of about 0.01 μm to about 1 μm.

The weight ratio of the core to the coating layer may range from about 99.9:0.1 to about 90:10.

According to another embodiment, a rechargeable lithium battery includes a negative electrode including the negative active material; a positive electrode including a positive active material capable of intercalating and deintercalating lithium; and a non-aqueous electrolyte.

According to yet another embodiment, a method of manufacturing a negative active material for a rechargeable lithium battery includes preparing a silicon oxide powder including an $SiO_2$ matrix and a Si grain; impregnating the silicon oxide powder in an etchant to etch at least a portion of the $SiO_2$ matrix, resulting in the Si grain being exposed on a surface of the silicon oxide powder to yield an etched powder; and surface treating the etched powder with a raw carbon material to provide a coating layer including SiC and carbon. The surface treatment may be carried out by a vapor method or a liquid method.

The silicon oxide powder may be impregnated in the etchant for about 5 minute to about 120 minutes.

In order to provide the etched powder with a carbon coating layer, the surface treatment may include a vapor deposition method performed using a raw carbon material reaction gas at a temperature of about 700° C. to about 1300° C.

Alternatively, a liquid method may be used, in which the surface of the etched powder is liquid-coated with the raw carbon material and carbonized at about 800° C. to about 1300° C. to provide the etched powder with a carbon coating layer.

The etchant may be a material including at least one F ion.

The rechargeable lithium battery including the negative active material has improved cycle-life characteristics.

DETAILED DESCRIPTION

Figure 1:
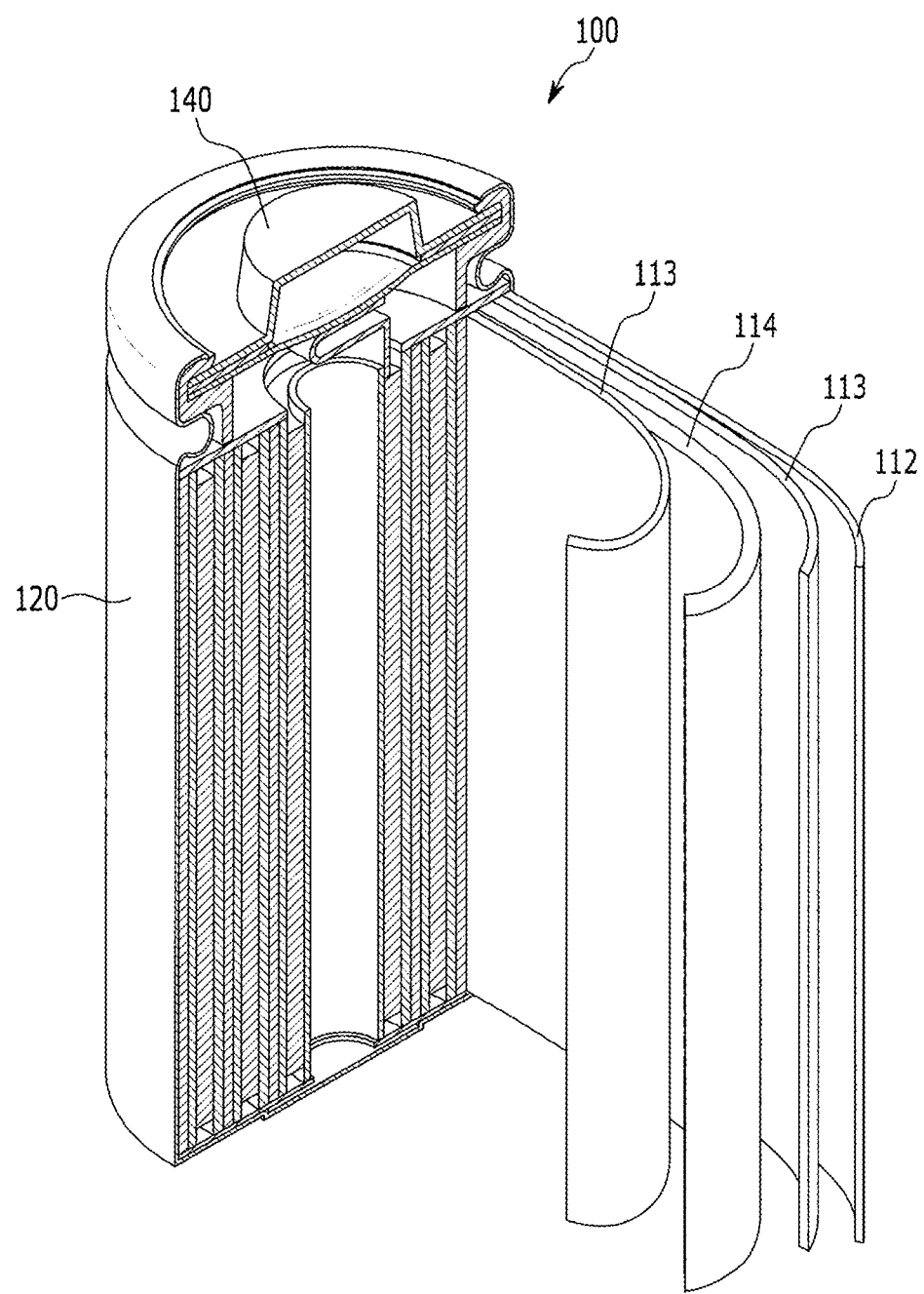
FIG. 1 is a cross-sectional perspective view of a rechargeable lithium battery according to one embodiment.

Exemplary embodiments will now be described in detail. However, these embodiments are only exemplary, and the present invention is not limited thereto.

According to one embodiment, a negative active material for a rechargeable lithium battery includes a core including a $SiO_2$ matrix and a Si grain, and a coating layer continuously or discontinuously coated on the core. The coating layer includes SiC and carbon.

The SiC included in the negative active material may improve cycle-life characteristics but has an adverse effect on capacity or efficiency. Accordingly, the negative active material according to embodiments of the present invention includes an appropriate amount of SiC, in order to improve cycle-life characteristics without deteriorating the capacity or efficiency characteristics.

The negative active material includes an amount of SiC sufficient to provide an XRD peak area ratio within a specified range. For example, the peak area ratio of the SiC (111) plane to the Si (111) plane as measured by X-ray diffraction (XRD) analysis using a CuKα ray ranges from about 0.01 to about 0.5

The core of the negative active material includes a $SiO_2$ matrix and a Si grain, and a ratio of the content of Si and O in the core may be represented by $SiO_x$ ($0.3 \leq x \leq 1.2$). The range of X may be determined by the content ratio of the $SiO_2$ matrix and the Si grain.

The carbon included in the coating layer may include crystalline carbon or amorphous carbon, or the like. For example, the crystalline carbon may include graphite (such as amorphous, sheet, flake, spherical, or fiber-shaped natural graphite or artificial graphite); and the amorphous carbon may include soft carbon (low temperature fire carbon) or hard carbon, mesophase pitch carbonized products, fired coke, or the like.

The negative active material may have an average particle size of about 0.5 μm to about 50 μm; and the coating layer may have a thickness of about 0.01 μm to about 1 μm. When the coating layer has a thickness within this range, cycle-life degradation caused by increasing resistance may be substantially prevented, thereby ensuring sufficient coating efficiency in order to achieve effective coating effect. The negative active material may have a weight ratio of the core to the coating layer of about 99.9:0.1 to about 90:10.

The method of manufacturing the negative active material may include preparing a silicon oxide powder including a $SiO_2$ matrix and a Si grain; impregnating the silicon oxide powder in an etchant for about 5 minute to about 12 minutes to etch at least a portion of the $SiO_2$ matrix, resulting in the Si grain being exposed on a surface of the silicon oxide powder to yield an etched powder; and surface treating the etched silicon oxide powder with a raw carbon material to provide a coating layer including SiC and carbon.

In the method of manufacturing the negative active material according to embodiments of the present invention, a silicon oxide powder including a $SiO_2$ matrix and a Si grain is first prepared. Any method of preparing the silicon oxide powder including the $SiO_2$ matrix and the Si grain may be used, and the method is limited to any specific method.

When the silicon oxide powder is impregnated in the etchant, the $SiO_2$ is selectively etched. The degree of etching of the $SiO_2$ may depend upon the etching time. In order to prepare the negative active material, the $SiO_2$ may be etched by impregnating it in the etchant for about 1 minute to about 1 hour. The etchant may be any suitable material, for example, an acid solution, or a material including at least one F ion, such as HF, $NH_4F$, $NH_4HF_2$, or the like.

If the compound including F ion is used for the etchant, F ion concentration of the etchant solution may be about 0.5M to 12M to etch at least a portion of the $SiO_2$ matrix. If the acid solution is used for the etchant, the skilled in the art may easily adjust the concentration of the acid solution to obtain the similar degree of an etching rate of the compound including F-ion as an etchant. Conventionally, the etching rate of the acid solution is slower than that of the compound including F-ion.

When the etched silicon oxide powder is provided with a carbon coating layer, the Si of the silicon oxide powder surface reacts with carbon to provide SiC. Accordingly, the carbon coating layer may include SiC as well as carbon (C). Since $SiO_2$ is removed on the surface of the etched silicon oxide powder, SiC is more easily formed. In this case, the content of SiC may be controlled by adjusting the carbon coating treatment temperature.

When providing the carbon coating layer using a vapor method, the raw carbon material may be injected as a reaction gas at a temperature of about 700 to about 1300° C., for example, at a temperature of about 950 to about 1050° C., to provide a carbon coating layer on the surface of the etched silicon oxide powder. The vapor method may include chemical vapor deposition (CVD) or the like.

When the carbon coating layer is formed using a liquid method, the raw carbon raw material is liquid coated on the surface of the etched silicon oxide powder and carbonized at a temperature of about 800 to about 1300° C., for example, at a temperature of about 1000 to about 1100° C. to provide a carbon coating layer. The liquid method may include impregnation, spraying, or the like. The solvent of the liquid coating may include DMSO (dimethylsulfoxide), THF (tetrahydrofuran), or the like.

Nonlimiting examples of the raw carbon material include coal pitch, mesophase pitch, petroleum pitch, coal oil, petroleum heavy oil, polymer resins such as phenol resins, furan resins, polyimide resins and the like. In some embodiments, the raw carbon material may be selected from vinyl-based resins such as polyvinylidene fluoride (PVDF), polyvinylchloride (PVC) and the like, conductive polymers such as polyaniline (PAn), polyacetylene, polypyrrole, polythiophene and the like. The conductive polymer may be a conductive polymer doped using hydrochloric acid or the like.

According to another embodiment of the present invention, a rechargeable lithium battery includes a negative electrode including the negative active material; a positive electrode including a positive active material capable of intercalating and deintercalating lithium; and a non-aqueous electrolyte.

Rechargeable lithium batteries may be classified into lithium ion batteries, lithium ion polymer batteries, and lithium polymer batteries according to the presence of a separator and the kind of electrolyte used in the battery. Rechargeable lithium batteries may have a variety of shapes and sizes, may include cylindrical, prismatic, or coin-type batteries, and may be thin film batteries or may be rather bulky in size. Structures and fabrication methods for lithium ion batteries are well known in the art.

FIG. 1 is a cross-sectional perspective view of a rechargeable lithium battery according to an embodiment of the present invention. Referring to FIG. 1, the rechargeable lithium battery 100 has a cylindrical shape and includes an electrode assembly including a negative electrode 112, a positive electrode 114, and a separator 113 between the positive electrode 114 and negative electrode 112. The electrode assembly is housed in a battery case 120, and the battery is impregnated with an electrolyte (not shown) and sealed with a sealing member 140. The electrode assembly is fabricated by sequentially stacking the negative electrode 112, positive electrode 114, and separator 113, spiral-winding the stack and housing the wound product in the battery case 120.

The negative electrode includes a current collector and a negative active material layer formed on the current collector. The negative active material layer includes the negative active material described above.

The negative active material layer may include a binder, and optionally may further include a conductive material.

The binder improves the binding properties of the negative active material particles to each other and to the current collector. Nonlimiting examples of the binder include polyvinylalcohol, carboxymethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

Any electrically conductive material may be used as the conductive material so long as it does not cause a chemical change. Nonlimiting examples of the conductive material include: carbon-based materials such as natural graphite, artificial graphite, carbon black, acetylene black, ketjen black, carbon fibers, and the like; metal-based materials including metal powders or metal fibers including copper, nickel, aluminum, silver, and the like; conductive polymers such as polyphenylene derivatives; and mixtures thereof.

The current collector may be selected from copper foils, nickel foils, stainless steel foils, titanium foils, nickel foams, copper foams, polymer substrates coated with a conductive metal, and combinations thereof.

The positive electrode includes a current collector and a positive active material layer disposed on the current collector.

The positive active material may be selected from lithiated intercalation compounds that reversibly intercalate and deintercalate lithium ions. The positive active material may include a composite oxide including at least one selected from cobalt, manganese, and nickel, as well as lithium. In particular, lithium-containing compounds satisfying the following formulae may be used:

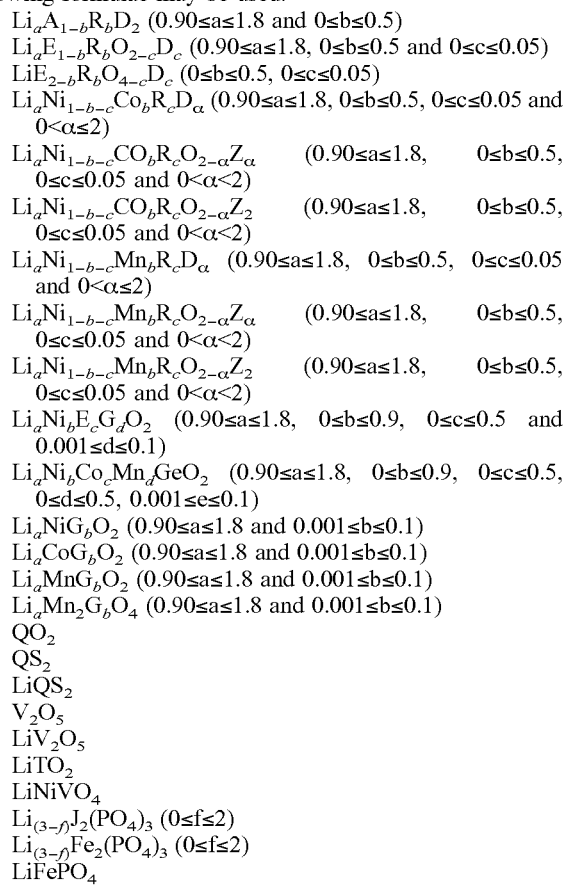

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound can have a coating layer on its surface, or it can be mixed with a compound having a coating layer. The coating layer may include at least one coating element included compound selected from oxides of a coating element, hydroxides of a coating element, oxyhydroxides of a coating element, oxycarbonates of a coating element, and hydroxyl carbonates of a coating element. The compounds for the coating layer can be amorphous or crystalline. The coating element for the coating layer may include Mg, Al, Co, K, Na, Ca, Si, Ti, V, Sn, Ge, Ga, B, As, Zr, or a mixture thereof. The coating layer can be formed by any method so long as it does not have a negative influence on the properties of the positive active material. For example, the method may include spray coating, dipping, or the like, which methods are known to those of ordinary skill in the art.

The positive active material layer may include a binder and a conductive material.

The binder improves the binding properties of the positive active material particles to each other and to the current collector. Nonlimiting examples of the binder include polyvinyl alcohol, carboxymethyl cellulose, hydroxypropyl cellulose, diacetyl cellulose, polyvinylchloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

The conductive material is used to provide conductivity to the electrode. In the battery, the conductive material may include any electrically conductive material so long as it does not cause a chemical change. Nonlimiting examples of the conductive material include natural graphite, artificial graphite, carbon black, acetylene black, ketjen black, carbon fiber, metal powders or metal fibers (including copper, nickel, aluminum, silver or the like), polyphenylene derivatives, and the like, and combinations thereof.

The current collector may be Al, but is not limited thereto.

Each of the negative and positive electrodes may be fabricated by mixing the active material, a conductive material, and a binder to form an active material composition, and coating the composition on a current collector. The electrode manufacturing method is known to those of ordinary skill in the art. The solvent may be N-methylpyrrolidone or the like, but is not limited thereto.

The electrolyte includes a non-aqueous organic solvent and a lithium salt.

The non-aqueous organic solvent serves as a medium for transmitting the ions taking part in the electrochemical reaction of the battery.

The non-aqueous organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Nonlimiting examples of the ester-based solvent include methyl acetate, ethyl acetate, n-propyl acetate, methylpropionate, ethylpropionate, γ-butyrolactone, decanolide, valerolactone, mevalonolactone, caprolactone, and the like.

Nonlimiting examples of the ether-based solvent include dibutyl ether, tetraglyme, diglyme, dimethoxyethane, 2-methyltetrahydrofuran, tetrahydrofuran, and the like. Nonlimiting examples of the ketone-based solvent include cyclohexanone, and the like. Nonlimiting examples of the alcohol-based solvent include ethyl alcohol, isopropyl alcohol, and the like. Nonlimiting examples of the aprotic solvent include nitriles (such as R-CN where R is a C2 to C20 linear, branched, or cyclic hydrocarbon group including a double bond, an aromatic ring, or an ether bond), amides (such as dimethylformamide), dioxolanes (such as 1,3-dioxolane), sulfolanes, and the like.

The non-aqueous organic solvent may include a single solvent or a combination of solvents. When the organic solvent includes a mixture of solvents, the mixture ratio can be controlled depending on the desired battery performance.

The carbonate-based solvent may be a mixture of a cyclic carbonate and a linear carbonate. The cyclic carbonate and the linear carbonate may be mixed together in a volume ratio of about 1:1 to about 1:9. Within this range, electrolyte performance may be improved.

In addition to the carbonate-based solvent, the non-aqueous organic electrolyte may further include an aromatic hydrocarbon-based solvent. The carbonate-based solvent and the aromatic hydrocarbon-based solvent may be mixed together in a volume ratio ranging from about 1:1 to about 30:1.

The aromatic hydrocarbon-based organic solvent may be represented by the following Chemical Formula 1.

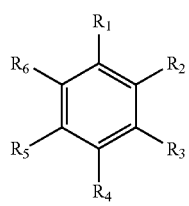

Chemical Formula 1

In Chemical Formula 1, each of $R_1$ to $R_6$ is independently selected from hydrogen, halogens, C1 to C10 alkyl groups, C1 to C10 haloalkyl groups, and combinations thereof.

Nonlimiting examples of aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate, an ethylene carbonate-based compound represented by the following Chemical Formula 2, or a combination thereof as an additive for improving cycle-life.

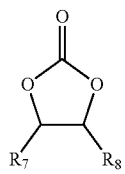

Chemical Formula 2

In Chemical Formula 2, each of $R_7$ and $R_8$ is independently selected from hydrogen, halogens, cyano groups (CN), nitro groups ($NO_2$), and C1 to C5 fluoroalkyl groups, provided that at least one of $R_7$ and $R_8$ is selected from halogens, cyano groups (CN), nitro groups ($NO_2$), and C1 to C5 fluoroalkyl groups.

Nonlimiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in an organic solvent, supplies the lithium ions in the battery, enables the basic operation of the rechargeable lithium battery, and improves lithium ion transportation between the positive and negative electrodes. Nonlimiting examples of the lithium salt include supporting electrolytic salts such as $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, $LiB(C_2O_4)_2$ (lithium bis(oxalato) borate, LiBOB), and combinations thereof. The lithium salt may be used in a concentration ranging from about 0.1 M to about 2.0 M. When the lithium salt is included at a concentration within the above concentration range, the electrolyte may have improved performance and lithium ion mobility due to optimal electrolyte conductivity and viscosity.

The separator 113 may include any material commonly used in conventional lithium batteries so long as it separates the negative electrode 112 from the positive electrode 114 and provides a passage for the transport of lithium ions. That is, the separator should have low resistance to ion transport and good electrolyte impregnation characteristics. Nonlimiting examples of materials for the separator include glass fiber, polyester, TEFLON (tetrafluoroethylene), polyethylene, polypropylene, polytetrafluoroethylene (PTFE), and combinations thereof. The separator may be a non-woven fabric or a woven fabric. For example, in a lithium ion battery, a polyolefin-based polymer separator such as polyethylene, polypropylene or the like may be used. In order to improve heat resistance or mechanical strength, a coated separator including a ceramic component or a polymer material may be used. The separator may have a mono-layered or multi-layered structure.

The following examples are presented for illustrative purposes only, and do not limit the scope of the present invention.

Example 1: Preparation of Negative Active Material 50 g of a silicon oxide powder (mole ratio 1:1) in which nano Si grains were dispersed in a silica ($SiO_2$) matrix was impregnated in 400 mL of 3M HF aqueous solution for 30 minutes to remove the surface $SiO_2$. After completing the reaction for removing the SiO₂, the remaining impurities were cleaned using a vacuum filter and dried. The dried silicon oxide powder was vapor carbon-coated by injecting methane gas at a temperature of 1000° C. for one hour using a rotary kiln. After completing the reaction, the coated powder was collected. The coated powder negative active material had a particle size of 5 μm, and the coating layer had a thickness of 50 nm.

Example 2: Preparation of Negative Active Material

A coated powder negative active material was prepared and collected as in Example 1, except that the silicon oxide powder was impregnated in 400 mL of an HF aqueous solution (4M HF) for 30 minutes to etch the SiO₂ surface. The coated powder negative active material had a particle size of 5 μm, and the coating layer had a thickness of 50 nm.

Example 3: Preparation of Negative Active Material

A coated powder negative active material was prepared and collected as in Example 1, except that the silicon oxide powder was impregnated in 400 mL of an HF aqueous solution (6M HF) for 30 minutes to etch the surface of the SiO₂. The coated powder negative active material had a particle size of 5 μm, and the coating layer had a thickness of 50 nm.

Comparative Example 1: Preparation of Negative Active Material 50 g of silicon oxide powder (mole ratio 1:1) in which nano Si grains were dispersed in a silica (SiO₂) matrix was vapor carbon-coated by injecting methane gas at a temperature of 1000° C. for one hour using a rotary kiln. After the reaction, the coated powder negative electrode was collected. The coated powder negative active material had a particle size of 5 μm, and the coating layer had a thickness of 50 nm.

Comparative Example 2: Preparation of Negative Active Material

The coated powder negative active material was prepared and collected as in Example 1, except that the silicon oxide powder was impregnated in an HF aqueous solution (12M HF) for 150 minutes to etch the surface of the SiO₂. The coated powder negative active material had a particle size of 5 μm, and the coating layer had a thickness of 50 nm.

Experimental Example 1: Measurement of X-ray Diffraction Analysis (XRD)

Figure 2:
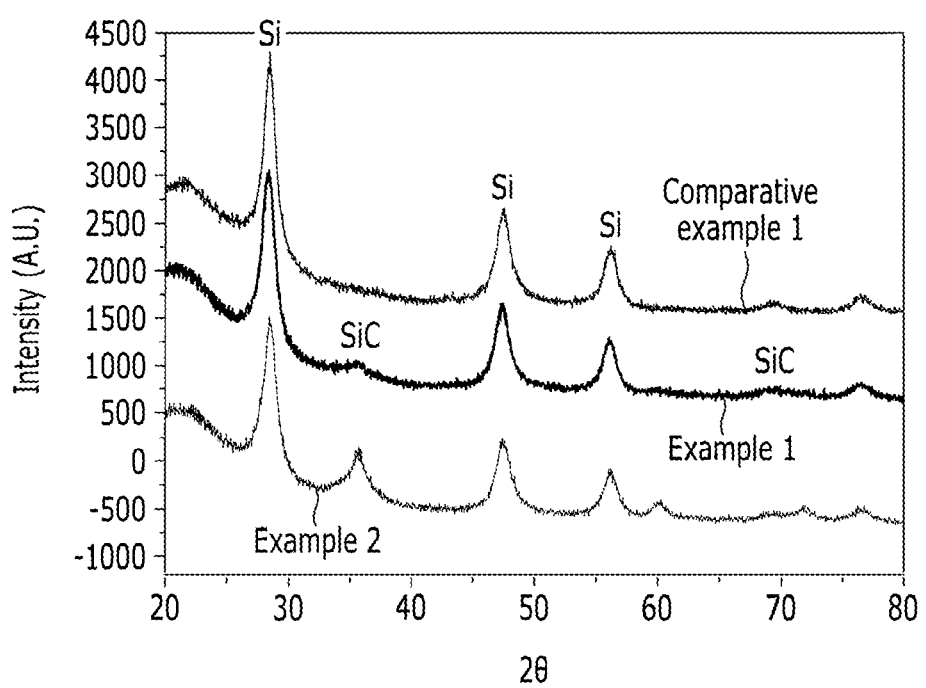
FIG. 2 is a graph comparing the results of X-ray diffraction (XRD) analysis of the negative active materials prepared according to Examples 1 and 2 and Comparative Example 1.

X-ray diffraction analysis (XRD) was performed on the negative active materials prepared in Examples 1 through 3 and Comparative Examples 1 and 2. The peak area ratios of the SiC (111) plane to the Si (111) plane as determined by the XRD analysis are shown in the following Table 1.
The XRD analysis conditions included the following:
Equipment setting: 40 kV & 40 mA
Target and wavelength: Cu a source, Cu Kα average (1.5418 Å)
Scan mode, step, interval: θ/2θ scan, 0.01° step, 3 sec/step
Slit system: D.S.=A.S.S.=0.5 deg FIG. 2 is a graph comparing the XRD measurement results for the negative active materials prepared according to Examples 1 and 2, and Comparative Example 1.

Experimental Example 2: Evaluation of Capacity Characteristics

A 2016 coin-type half cell was fabricated using each of the negative active materials prepared according to Examples 1 through 3, and Comparative Examples 1 and 2. Each cell was charged and discharged at 25° C. and 0.5 C, and the first cycle discharge capacity (initial capacity) was measured. The results are shown in the following Table 1.

Experimental Example 3: Evaluation of Cycle-Life Characteristic

Figure 3:
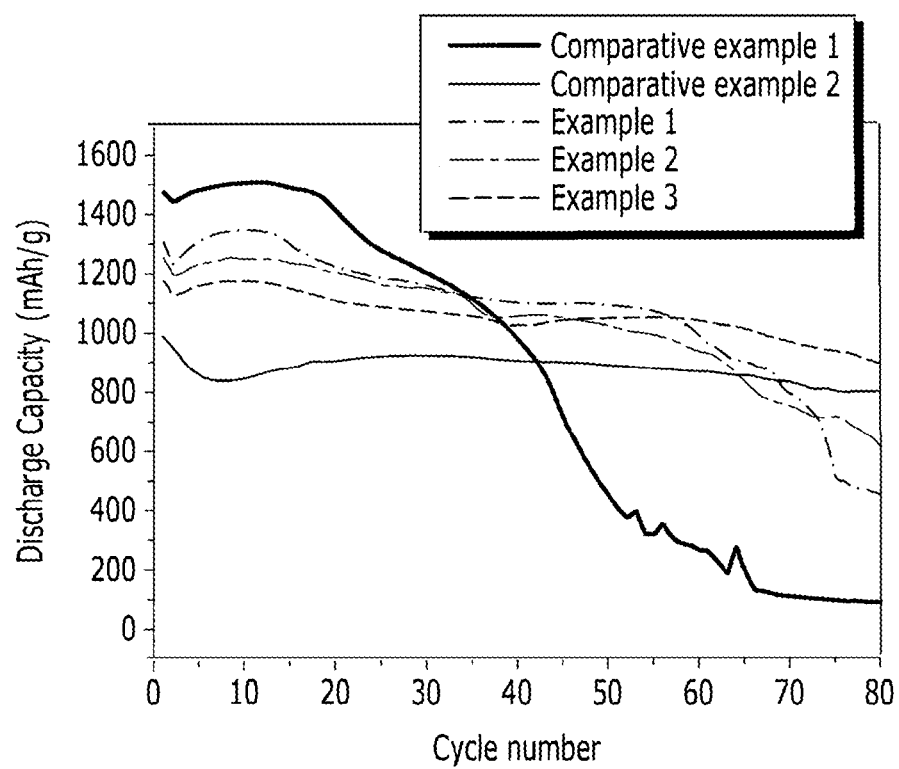
FIG. 3 is a graph comparing the cycle-life characteristics of the rechargeable lithium batteries fabricated using the negative active materials prepared according to Examples 1 through 3 and Comparative Examples 1 and 2.

The cycle-life characteristics of each 2016 coin-type half cell prepared using the negative active materials prepared according to Examples 1 through 3, and Comparative Examples 1 and 2 was evaluated by charging and discharging each cell at 25° C. and 0.5 C 80 times. The results are shown in FIG. 3. The capacity retention after 80 cycles was calculated using the following equation: capacity retention (%)=80 cycle discharge capacity/first cycle discharge capacity The results are shown in the following Table 1.

TABLE 1

| | Peak area ratio of SiC (111) plane and Si (111) plane | Discharge capacity at first cycle (mAh/g) | Capacity retention (discharge capacity at 80th cycle/ discharge capacity at first cycle)(%) |
| --- | --- | --- | --- |
| Example 1 | 0.11 | 1300 | 0.35 |
| Example 2 | 0.23 | 1250 | 0.49 |
| Example 3 | 0.42 | 1177 | 0.76 |
| Comparative Example 1 | <0.05 | 1470 | 0.06 |
| Comparative Example 2 | 0.58 | 998 | 0.81 |

As shown in Table 1, Comparative Example 1 (including an insufficient amount of SiC) showed bad cycle-life characteristics, and Comparative Example 2 (including an excessive amount of SiC) showed inferior capacity characteristics. From these results, it is confirmed that the cycle-life characteristics were improved by increasing the SiC content, and that when the SiC provided in excess (i.e., outside the range disclosed in embodiments of the present invention), the capacity was inadequate. Accordingly, these results show that when SiC is included within the range disclosed in embodiments of the present invention, both the capacity and the cycle-life characteristics are good.

While certain exemplary embodiments of the present invention have been illustrated and described, the invention is not limited to the disclosed embodiments. On the contrary, those of ordinary skill in the art will recognize that certain modifications and changes can be made to the described embodiments without departing from the spirit and scope of the invention, as described in the appended claims.

What is claimed is:
1. A negative active material for a rechargeable lithium battery, comprising:
a core comprising a Si grain in a SiO₂ matrix; and
a coating layer on at least a portion of the core, the coating layer comprising carbon, wherein in the core of the negative active material, amounts of the $SiO_2$ matrix and the Si grain are sufficient to yield an oxygen and silicon content represented by SiOx in which 1≤x≤1.2, and wherein the coating layer comprises SiC, with a peak area ratio of the SiC (111) plane to the Si (111) plane as measured by X-ray diffraction analysis using a CuKα ray in a range from about 0.1 to about 0.5.

2. The negative active material according to claim 1, wherein the coating layer has a thickness of about 0.01 µm to about 1 µm, and wherein the negative active material has an average particle size of about 0.5 µm to about 50 µm.

3. The negative active material according to claim 1, wherein a weight ratio of the core to the coating layer is about 99.9:0.1 to about 90:10.

4. The negative active material according to claim 1, wherein the carbon comprises crystalline carbon, amorphous carbon, or a combination thereof.

5. The negative active material according to claim 4, wherein the amorphous carbon comprises soft carbon, hard carbon, mesophase pitch carbonized products, fired coke, or a combination thereof.

6. The negative active material according to claim 4, wherein the carbon is comprised in SiC or a carbonized carbonaceous material.

7. A rechargeable lithium battery comprising:
a positive electrode comprising a positive electrode active material;
an electrolyte comprising a non-aqueous organic solvent;
a separator; and
a negative electrode comprising a negative active material comprising:
a core comprising a Si grain in a $SiO_2$ matrix; and
a coating layer on at least a portion of the core, the coating layer comprising carbon,
wherein in the core of the negative active material, amounts of the $SiO_2$ matrix and the Si grain are sufficient to yield an oxygen and silicon content represented by SiOx in which 1≤x≤1.2, and wherein the coating layer comprises SiC, with a peak area ratio of the SiC (111) plane to the Si (111) plane as measured by X-ray diffraction analysis using a CuKα ray in a range from about 0.1 to about 0.5.

8. The rechargeable lithium battery according to claim 7, wherein the coating layer has a thickness of about 0.01 µm to about 1 µm, and wherein the negative active material has an average particle size of about 0.5 µm to about 50 µm.

9. The rechargeable lithium battery according to claim 7, wherein a weight ratio of the core to the coating layer is about 99.9:0.1 to about 90:10.

10. The rechargeable lithium battery according to claim 7, wherein the positive electrode active material comprises at least two of Ni, Mn, and Al.

11. The rechargeable lithium battery according to claim 7, wherein the carbon comprises crystalline carbon, amorphous carbon, or a combination thereof.

12. The rechargeable lithium battery according to claim 11, wherein the amorphous carbon comprises soft carbon, hard carbon, mesophase pitch carbonized products, fired coke, or a combination thereof.

13. The rechargeable lithium battery according to claim 7, wherein the carbon is comprised in SiC or a carbonized carbonaceous material.

14. The rechargeable lithium battery according to claim 7, wherein the negative active material further comprises a binder, a conductive material, or a combination thereof.

15. The rechargeable lithium battery according to claim 14, wherein the conductive material comprises a carbon-based material comprising: natural graphite, artificial graphite, carbon black, acetylene black, ketjen black, or carbon fibers; a metal-based material comprising metal powders or metal fibers comprising copper, nickel, aluminum, or silver; a conductive polymer comprising polyphenylene derivatives; or a combination thereof.

16. The rechargeable lithium battery according to claim 7, wherein the non-aqueous organic solvent comprises a cyclic carbonate and a linear carbonate.

17. The rechargeable lithium battery according to claim 16, wherein the non-aqueous organic solvent further comprises vinylene carbonate, an ethylene carbonate-based compound represented by the following Chemical Formula 2, or a combination thereof:

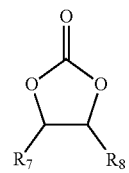

Chemical Formula 2 wherein in Chemical Formula 2, each of $R_7$ and $R_8$ is independently selected from hydrogen, halogens, cyano groups (CN), nitro groups ($NO_2$), or C1 to C5 fluoroalkyl groups, provided that at least one of $R_7$ and $R_8$ is selected from halogens, cyano groups (CN), nitro groups ($NO_2$), or C1 to C5 fluoroalkyl groups.

18. The rechargeable lithium battery according to claim 17, wherein the ethylene carbonate-based compound represented by Chemical Formula 2 comprises difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or a combination thereof.

19. The rechargeable lithium battery according to claim 7, wherein the separator comprises polyethylene.

20. The rechargeable lithium battery according to claim 7, wherein the separator comprises a ceramic component.

* * * * *